United States Patent
Fleming

(10) Patent No.: US 9,610,917 B2
(45) Date of Patent: Apr. 4, 2017

(54) RESTRAINT SYSTEM WITH DUAL RELEASE MECHANISMS

(75) Inventor: John Fleming, Oldsmar, FL (US)

(73) Assignee: Carleton Life Support Systems, Inc., Davenport, IA (US)

( * ) Notice: Subject to any disclaimer, the term of this patent is extended or adjusted under 35 U.S.C. 154(b) by 144 days.

(21) Appl. No.: 13/543,449

(22) Filed: Jul. 6, 2012

(65) Prior Publication Data

US 2013/0062144 A1  Mar. 14, 2013

Related U.S. Application Data

(60) Provisional application No. 61/505,817, filed on Jul. 8, 2011.

(51) Int. Cl.
| | | |
|---|---|---|
| B60R 22/02 | (2006.01) | |
| A62B 35/00 | (2006.01) | |
| B64D 25/06 | (2006.01) | |

(52) U.S. Cl.
CPC .............. *B60R 22/02* (2013.01); *A62B 35/00* (2013.01); *B64D 25/06* (2013.01)

(58) Field of Classification Search
CPC . A62B 35/00; A62B 35/0025; A62B 35/0031; A62B 35/0037; A62B 35/04; B64D 25/06; B60R 22/00; B60R 22/02; B60R 22/32; B60R 22/321; B60R 22/322; B60R 22/324; B60R 22/48
USPC .................................................... 182/3, 5, 6
See application file for complete search history.

(56) References Cited

U.S. PATENT DOCUMENTS

| | | | |
|---|---|---|---|
| 41,000 A | | 12/1863 | Gray |
| 1,233,376 A | * | 7/1917 | Link ........................... 294/82.33 |
| 3,930,290 A | * | 1/1976 | Mangels ....................... 114/108 |
| 3,963,090 A | * | 6/1976 | Hollins ......................... 180/268 |
| 4,093,293 A | * | 6/1978 | Huggett ...................... 294/82.33 |
| 4,162,715 A | * | 7/1979 | Coulombe ................. 280/801.1 |
| 4,189,022 A | * | 2/1980 | Lazich et al. ................. 180/268 |
| 4,273,216 A | | 6/1981 | Weissmann |
| 4,279,062 A | * | 7/1981 | Boissonnet ..................... 24/305 |
| 4,432,119 A | * | 2/1984 | Schwark et al. ................. 24/603 |
| 4,447,084 A | * | 5/1984 | Jankowiak et al. ........ 294/82.29 |
| 4,553,625 A | * | 11/1985 | Tsuge et al. .................. 180/268 |
| 4,555,831 A | * | 12/1985 | Otzen et al. .................... 24/603 |
| 4,574,911 A | * | 3/1986 | North ............................ 180/270 |
| 4,644,616 A | * | 2/1987 | Ferry ............................... 24/602 |
| 4,715,096 A | * | 12/1987 | Fleming et al. ................ 24/602 |
| 4,920,619 A | * | 5/1990 | Bender et al. .................. 24/602 |
| 5,121,527 A | * | 6/1992 | Righi ............................... 24/602 |
| 5,123,498 A | * | 6/1992 | Alcidi et al. .................. 180/268 |

(Continued)

*Primary Examiner* — Daniel Cahn
*Assistant Examiner* — Shiref Mekhaeil
(74) *Attorney, Agent, or Firm* — Woods Oviatt Gilman LLP; Katherine H. McGuire, Esq.

(57) ABSTRACT

Disclosed is a restraint system for a vehicle. A crewmember or occupant is interconnected to the restraint system by way of a strap. The strap has two separate and independently operable release mechanisms. The strap permits the occupant to be either manually or automatically released from the associated restraint. The restraint can be mounted within any of a variety of land, sea, air, or space based vehicles. In one non-limiting embodiment, the first release mechanism is automatically activated in response to a triggering event and the second release mechanism is manually activated by the occupant pulling on a lanyard.

6 Claims, 4 Drawing Sheets

(56) References Cited

U.S. PATENT DOCUMENTS

| | | | | |
|---|---|---|---|---|
| 5,165,498 | A * | 11/1992 | Garboli et al. | 180/268 |
| 5,197,410 | A | 3/1993 | Wilson et al. | |
| RE34,351 | E * | 8/1993 | Lacey | 119/776 |
| 5,487,444 | A | 1/1996 | Dennington | |
| 5,544,363 | A | 8/1996 | McCue et al. | |
| 5,738,046 | A | 4/1998 | Williams et al. | |
| 5,769,475 | A * | 6/1998 | Tylaska | 294/82.2 |
| 5,784,763 | A | 7/1998 | Cassidy | |
| 5,857,246 | A * | 1/1999 | Becnel | 24/602 |
| 5,909,802 | A | 6/1999 | Puco et al. | |
| 5,970,517 | A | 10/1999 | Jordan | |
| 6,233,740 | B1 | 5/2001 | Meyers et al. | |
| 6,367,582 | B1 | 4/2002 | Derby | |
| 6,382,139 | B1 * | 5/2002 | Rhodes | 119/776 |
| 6,487,725 | B1 | 12/2002 | Jordan | |
| 6,732,834 | B2 | 5/2004 | Colorado | |
| 6,832,417 | B1 * | 12/2004 | Choate | 24/600.1 |
| 6,896,291 | B1 | 5/2005 | Peterson | |
| 6,930,611 | B1 * | 8/2005 | Van Druff et al. | 340/644 |
| 6,983,913 | B2 | 1/2006 | Auvray | |
| 6,990,928 | B2 | 1/2006 | Kurtgis | |
| 7,086,091 | B2 | 8/2006 | Jordan | |
| 7,178,208 | B2 * | 2/2007 | Bentsen et al. | 24/303 |
| 7,275,710 | B2 * | 10/2007 | VanDruff et al. | 244/1 R |
| 7,448,116 | B1 | 11/2008 | Howell | |
| 7,481,399 | B2 | 1/2009 | Nohren et al. | |
| 7,699,761 | B1 | 4/2010 | Dieter et al. | |
| 7,814,567 | B2 | 10/2010 | Dovner et al. | |
| 7,828,180 | B2 * | 11/2010 | Slesar | 224/257 |
| 7,941,902 | B1 * | 5/2011 | Roy et al. | 24/602 |
| 7,979,917 | B2 | 7/2011 | Osborne | |
| 7,979,919 | B2 | 7/2011 | Joran | |
| 8,007,419 | B2 | 8/2011 | Dieter et al. | |
| 8,056,196 | B2 * | 11/2011 | Sample et al. | 24/601.5 |
| 8,066,161 | B2 | 11/2011 | Green et al. | |
| 8,074,326 | B2 * | 12/2011 | Slank | 24/165 |
| 8,087,102 | B2 | 1/2012 | Kordecki | |
| 8,127,409 | B2 * | 3/2012 | Roy et al. | 24/602 |
| 8,201,271 | B2 | 6/2012 | Dennis | |
| 8,256,026 | B2 | 9/2012 | Garrigos | |
| 8,336,663 | B2 * | 12/2012 | Schramm | 180/268 |
| 8,356,692 | B1 | 1/2013 | Steck et al. | |
| 8,370,962 | B2 | 2/2013 | McBride et al. | |
| 8,479,312 | B2 | 7/2013 | Dovner et al. | |
| 8,490,212 | B1 | 7/2013 | Asher et al. | |
| 8,499,362 | B2 | 8/2013 | Dennis | |
| 8,533,862 | B2 | 9/2013 | Khandelwal | |
| 8,590,935 | B1 * | 11/2013 | Leedy | 280/808 |
| 8,657,068 | B2 * | 2/2014 | Gassner | 182/12 |
| 2002/0023797 | A1 * | 2/2002 | Baca | 180/271 |
| 2002/0175025 | A1 | 11/2002 | Kurtgis | |
| 2002/0175246 | A1 | 11/2002 | Kurtgis | |
| 2004/0140152 | A1 | 7/2004 | Richardson | |
| 2005/0005342 | A1 | 1/2005 | Johnson | |
| 2006/0113147 | A1 | 6/2006 | Harris, Jr. | |
| 2006/0163304 | A1 | 7/2006 | Slesar | |
| 2007/0107109 | A1 | 5/2007 | Johnson | |
| 2008/0235841 | A1 | 10/2008 | McDunn et al. | |
| 2008/0263737 | A1 | 10/2008 | Parks et al. | |
| 2009/0064400 | A1 | 3/2009 | Garrigos | |
| 2009/0071750 | A1 * | 3/2009 | Simard et al. | 182/5 |
| 2009/0173578 | A1 * | 7/2009 | Renton et al. | 182/235 |
| 2009/0188749 | A1 * | 7/2009 | Hong | 182/3 |
| 2009/0211000 | A1 | 8/2009 | Roux | |
| 2009/0282595 | A1 | 11/2009 | Branson et al. | |
| 2010/0071106 | A1 | 3/2010 | Parks et al. | |
| 2010/0101892 | A1 * | 4/2010 | Elders et al. | 182/3 |
| 2010/0206921 | A1 * | 8/2010 | Shen | 224/150 |
| 2010/0229357 | A1 | 9/2010 | Sample et al. | |
| 2010/0300802 | A1 | 12/2010 | Kopp | |
| 2010/0313327 | A1 | 12/2010 | Anscher | |
| 2010/0313392 | A1 | 12/2010 | Anscher | |
| 2011/0023203 | A1 | 2/2011 | Dovner et al. | |
| 2011/0072546 | A1 | 3/2011 | Taylor et al. | |
| 2011/0072566 | A1 | 3/2011 | Kovacevich et al. | |
| 2011/0099776 | A1 | 5/2011 | Anscher | |
| 2011/0103558 | A1 | 5/2011 | Hooten | |
| 2011/0113520 | A1 | 5/2011 | Dennis | |
| 2011/0277212 | A1 | 11/2011 | Jones | |
| 2011/0315466 | A1 * | 12/2011 | Ammons | 180/268 |
| 2012/0024627 | A1 * | 2/2012 | Harshbarger et al. | 182/5 |
| 2012/0030852 | A1 | 2/2012 | Anscher | |
| 2012/0174286 | A1 | 7/2012 | McBride et al. | |
| 2013/0020149 | A1 * | 1/2013 | Wise | 182/3 |
| 2013/0062144 | A1 | 3/2013 | Fleming | |
| 2014/0008147 | A1 * | 1/2014 | Jones et al. | 182/3 |
| 2014/0047682 | A1 * | 2/2014 | Blackman et al. | 24/637 |

\* cited by examiner

RESTRAINT SYSTEM WITH DUAL RELEASE MECHANISMS

CROSS-REFERENCE TO RELATED APPLICATIONS

This application claims priority to and is a continuation of Application Ser. No. 61/505,817 entitled "Crewmember Strap with Dual Release Mechanisms" filed on Jul. 8, 2011. The contents of this co-pending application are fully incorporated herein for all purposes.

BACKGROUND OF THE INVENTION

Field of the Invention

This invention relates to a restraint system. More particularly, the present invention relates to a restraint system having two independent release mechanisms Description of the Background Art Restraint systems are known in the art. Restraint systems, such as conventional seat belts, include a length of webbing that secure an occupant within a vehicle. Other restraint systems include a occupant worn vest or harness that releasably attaches to the webbing. The length of webbing, in turn, can be secured to either a fixed anchor point within the vehicle or to an inertial reel. Such restraint systems can be used in a wide variety of vehicles, such as land, sea, or spaced based vehicles.

If a reel is employed, it can be positioned above (or to the side of) the user so that the webbing can be dispensed to facilitate occupant movement within the vehicle. An accelerometer within the reel can lock the webbing to secure the occupant in the event of sudden or severe movements, accidents, crashes, or rapid acceleration or deceleration, or any other event that would warrant the occupant being immediately restrained (i.e. a "triggering event"). By locking the reel in response to a triggering event, the occupant is protected again injury and/or being ejected from the vehicle.

An example of an overhead restraint system is described in commonly owned U.S. Pat. No. 7,275,710 to Van Druff et al. Van Druff discloses an aircrew restraint system that includes a track and a trolley that runs along the track. The trolley includes an interlock pin that cooperates with interlock hooks spaced within the track. A webbing strap connects an aircrew harness to a strap retractor. In order for the occupant to release the trolley, they must grasp an overhead handle.

Regardless of the type of restraint system employed, whether an overhead restraint, fixed anchor point, or otherwise, a mechanism is needed for quickly and easily uncoupling the occupant. Although it is important to adequately restrain an occupant during a triggering event, it is similarly important to allow the occupant to be released upon the conclusion of the triggering event. Uncoupling an occupant from the restraint may be especially important in the event of a crash or water landing. These emergency situations require the restrained individual to immediately separate himself or herself from the restraint system to prevent serious bodily injury or death. This task is complicated by the fact that the webbing may be secured to the back of the occupant via a harness. The occupant may also have been incapacitated as a result of the triggering event, thereby making it impossible for the occupant to release himself or herself. The restraint system of the present disclosure is aimed at overcoming these and other problems.

SUMMARY OF THE INVENTION

The disclosed restraint system presents several important advantages over prior systems. One possible advantage is attained by providing two separate and independent mechanisms for releasing an occupant from an associated restraint system.

A further possible advantage is achieved by allowing a restrained occupant to be quickly and easily released following a triggering event.

Another possible advantage is realized by providing a means for allowing an occupant to selectively free themselves from an associated restraint when needed in either emergency or non-emergency situations.

Still yet another advantage is attained by providing a means for automatically releasing an occupant from a restraint in the presence of water.

A further advantage is recognized by incorporating both a manual release mechanism and an automatic release mechanism in a single occupant restraint.

Various embodiments of the invention may have none, some, or all of these advantages. Other technical advantages of the present invention will be readily apparent to one skilled in the art.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure.

| PARTS LIST | |
|---|---|
| 20 | System |
| 22 | Strap |
| 24 | First End of Strap |
| 26 | Second End of Strap |
| 28 | Release System |
| 32 | Housing of Release System |
| 34 | D-Ring of Release System |
| 34a | Apertures in D-Ring |
| 36 | Locking Pins of Release System |
| 38 | Strap Mounting on Release System |
| 42 | Hook |
| 44 | Base of Hook |
| 46 | Trigger for Hook |
| 48 | Pivotal Extent of Hook |
| 52 | Cable for Trigger |
| 54 | Lanyard for Trigger |
| 56 | Plunger of Spinnaker-type Hook |
| 58 | Crew Member Vest |
| 60 | Attachment Points on Vest |
| 62 | Tether for Overhead Reel |

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENTS

The present invention relates to a restraint system for a vehicle. A crewmember or occupant is interconnected to the restraint system by way of a strap. The strap has two separate and independently operable release mechanisms. The strap permits the occupant to be either manually or automatically released from the associated restraint. The restraint can be mounted within any of a variety of land, sea, air, or space based vehicles. In one non-limiting embodiment, the first release mechanism is automatically activated in response to a triggering event and the second release mechanism is manually activated by the occupant pulling on a lanyard.

Figure 1:
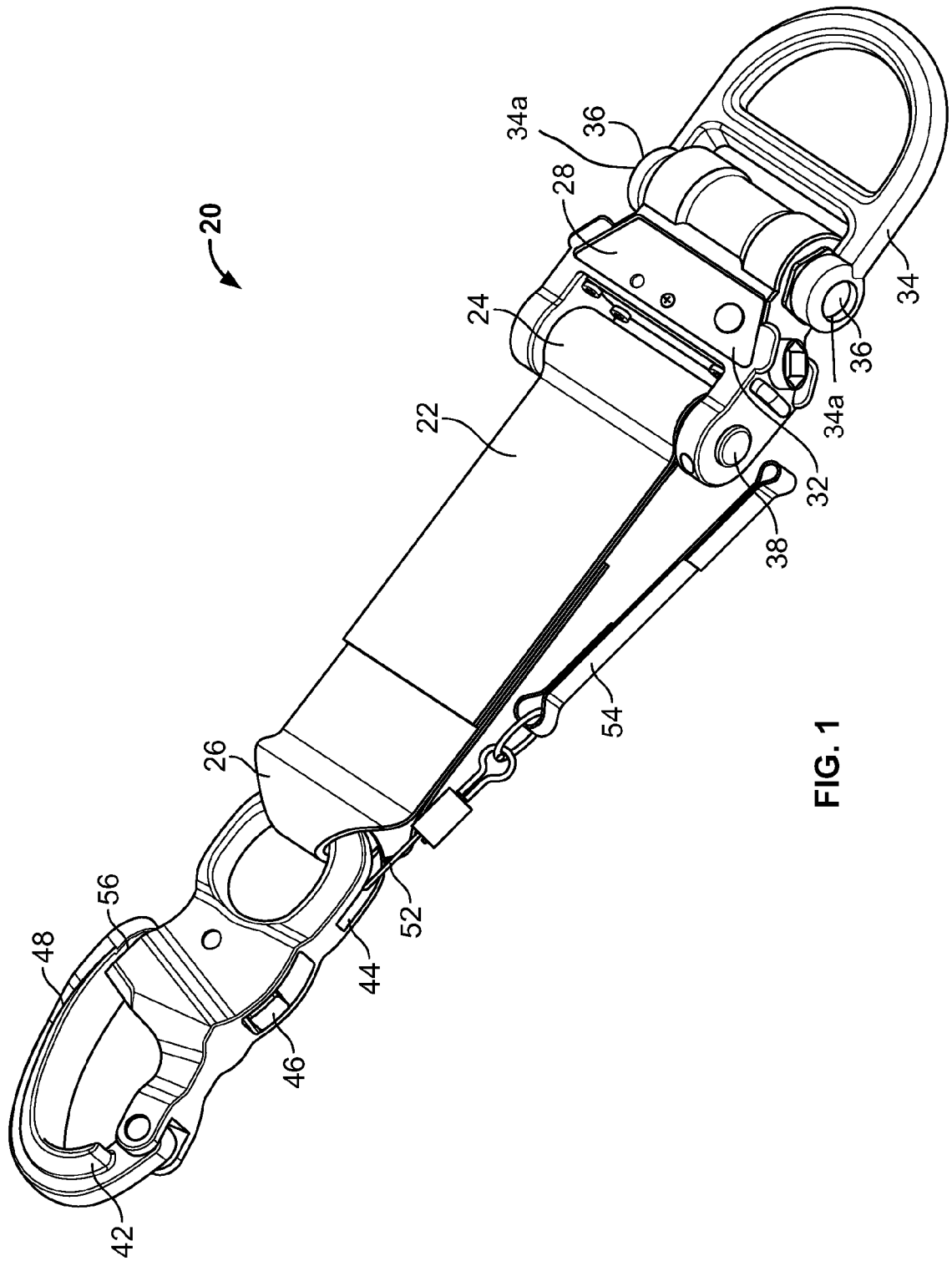
FIG. 1 is a perspective view of the restraint system of the present disclosure.
Figure 5:
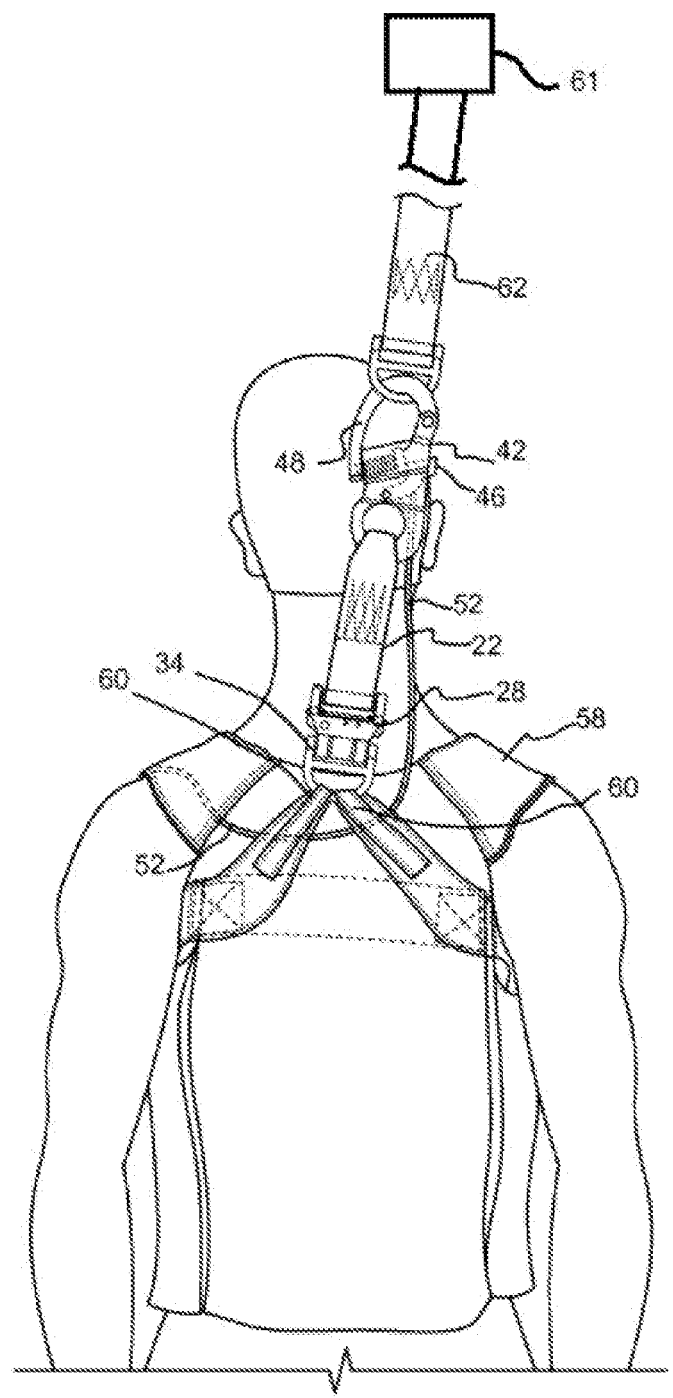
FIG. 5 is a detailed view of the system used in connection with an overhead reel.

With reference to FIG. 1, the system 20 of the present disclosure is illustrated. System 20 comprises a strap 22 with first and second ends (24 and 26). Strap 22 can take the form of a length of webbing. In one non-limiting example, the webbing is formed from nylon and is approximately 12 inches long. However, other lengths and materials can also be used for strap 22. Loops can be formed at either end of strap 22 to permit it to be coupled to first and second release mechanisms. The first and second release mechanisms, in turn, are coupled to first and second components of the restraint system. In the depicted embodiment, the first release mechanism 28 is an automatic release that is coupled to an occupant worn vest 58; the second release mechanism 42 is a manual release that is coupled to an overhead reel 61 (FIG. 5). However, the positions of the first and second release mechanisms in relation to the first and second components of the restraint system can be reversed as needed.

As noted in FIGS. 1 and 5, a first automatic release system 28 is connected to the first end 24 of strap 22. Release system 28 functions in separating strap 22 from an occupant worn vest 58 in response to a triggering event. In one embodiment, the release system 28 is a water activated release system, or "WARS," with the triggering event being the presence of water. Any of a variety of known water activated release mechanisms can be used for WARS 28. System 20 can also be used in connection with other types of release mechanisms.

In one embodiment, release system 28 is the water activated release triggering mechanism disclosed in U.S. Pat. No. 6,930,611 to Van Druff et. al. The '611 patent and the present application are commonly owned. The specification of the '611 patent is incorporated herein for all purposes. Release system 28 includes an internal circuit with both an activated and a deactivated state. The activated state is achieved when the circuit is immersed in water. As long as the circuit remains dry and not immersed in water, it is maintained in the deactivated state and strap 22 remains coupled to the restraint system.

Release system 28 includes a housing 32 that is releasably connected to a D-Ring 34. Release system 28 further includes a mounting bar 38 that extends between two upstanding arms. Mounting bar 28 is positioned within a loop formed at the first end 24 of strap 22. D-ring 34, in turn, is used in securing release system 28 to the occupant. For example, D-ring 34 can be secured to either the front side or the back side of an occupant worn vest (note FIGS. 2 and 5). D-Ring 34 includes a pair of apertures 34a for receiving a pair of oppositely disposed locking pins 36 from release system 28 (note FIG. 1). Locking pins 36 have both an extended and a retracted orientation. Locking pins 36 are kept in locking engagement with the pins 36 being secured within openings 34a of D-Ring 34. As such, in the normal orientation, D-ring 34 is lockingly coupled to housing 32. However, if release system 28 is immersed in water, such as may occur in the event of a crash landing, a circuit is completed to fire a solenoid within housing 32. This action permits locking pins 36 to be retracted, thereby permitting D-ring 34 to be separated from housing 32. This also frees the occupant from the remainder of the restraint system.

It is within the scope of the present disclosure to utilize other types of release systems 28 that are responsive to other types of triggering events. For instance, system 28 may include a sensor that is responsive to extreme heat to release the occupant in response to a fire. Release system 28 may also be triggered in response to controls that are operable by other occupants of the vehicle.

A hook 42, which may be a spinnaker-type hook, is secured to the second end 26 of strap 22. Hook 42 includes a base potion 44 with a loop that is adapted to be permanently secured to second end 26 of strap 22. Hook 42 further includes a trigger 46 that permits a pivotal extent 48 to be released and opened. Pivotal extent 48, in the depicted embodiment, takes the form of a J-shaped hook. A cable 52 and a lanyard 54 are coupled to trigger 46 to allow manual actuation. More specifically, as cable 52 and lanyard 54 are pulled, trigger 46 is activated. This retracts a spring biased plunger 56 from an opening in pivotal extent 48. This, in turn, allows pivotal extent 48 to pivot open.

With reference to FIG. 5, strap 22 may be fitted between a crewmember vest 58 and the tether 62 of an overhead restraint. Vest 58 may include two attachment points 60 for securing vest 58 to D-Ring 34. Tether 62 may include a D-ring for attachment to hook 42. For example, strap 22 can be used in connection with the crew member restraint system disclosed in U.S. Pat. No. 7,275,710 to Van Druff et al. The '710 patent and the present application are commonly owned. The '710 patent is fully incorporated herein for all purposes. In the embodiment depicted, strap 22 is substantially shorter than tether 62. Strap 22 may be approximately 12 inches long. The length of strap 22 is preferably such that its extends between the base of the neck and the back of the occupant's head. Lanyard 54 may be omitted in this embodiment. Instead, cable 52 can be routed through an opening in vest 58, over the occupant's shoulder, and to a mounting point on the front of vest 58. This would allow occupant to easily pull cable 52 and separate himself from the restraint system as needed.

Figure 2:
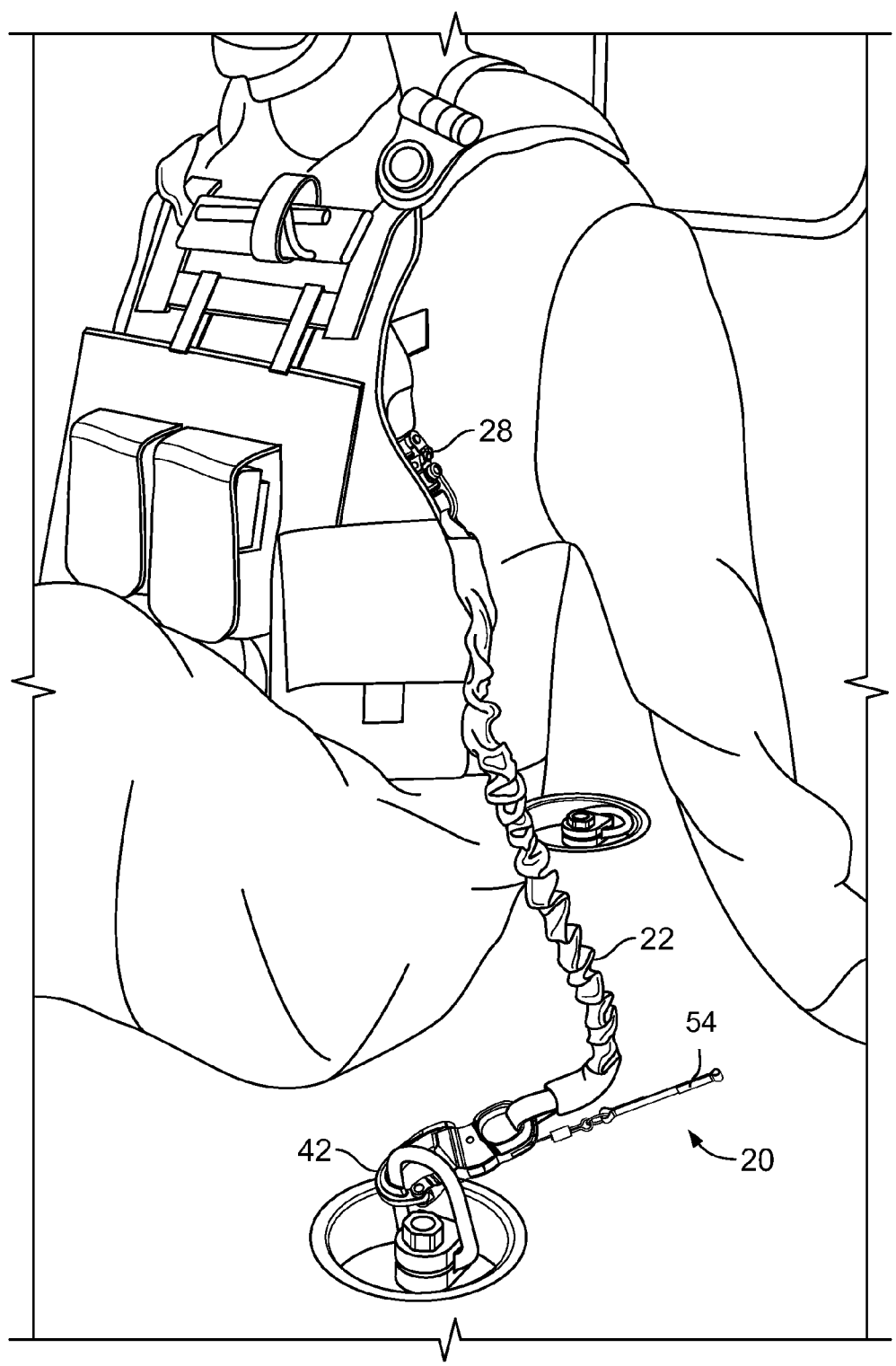
FIG. 2 is a view of the restraint system being used to secure an occupant to a fixed anchor point within a vehicle.
Figure 3:
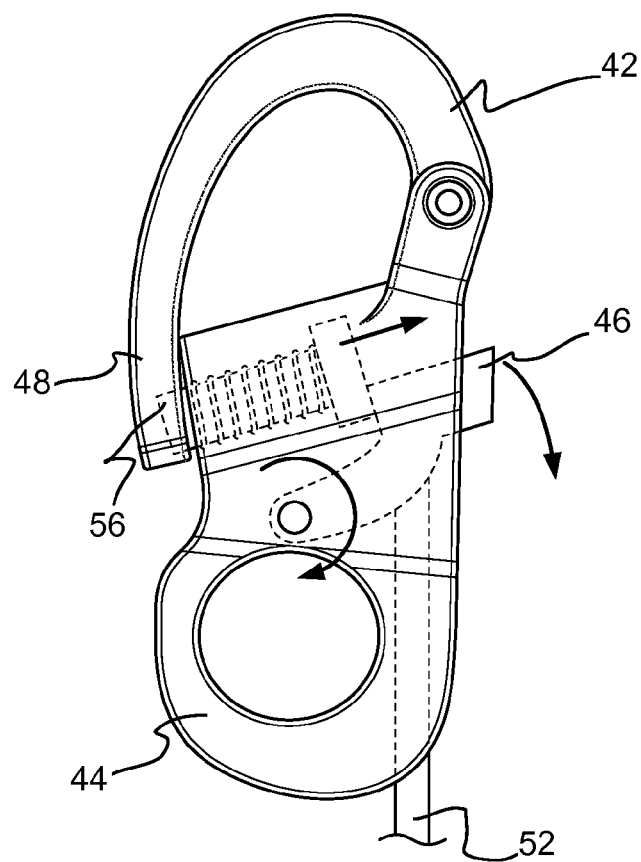
FIG. 3 is a detailed view of the hook employed by the system of the present disclosure.
Figure 4:
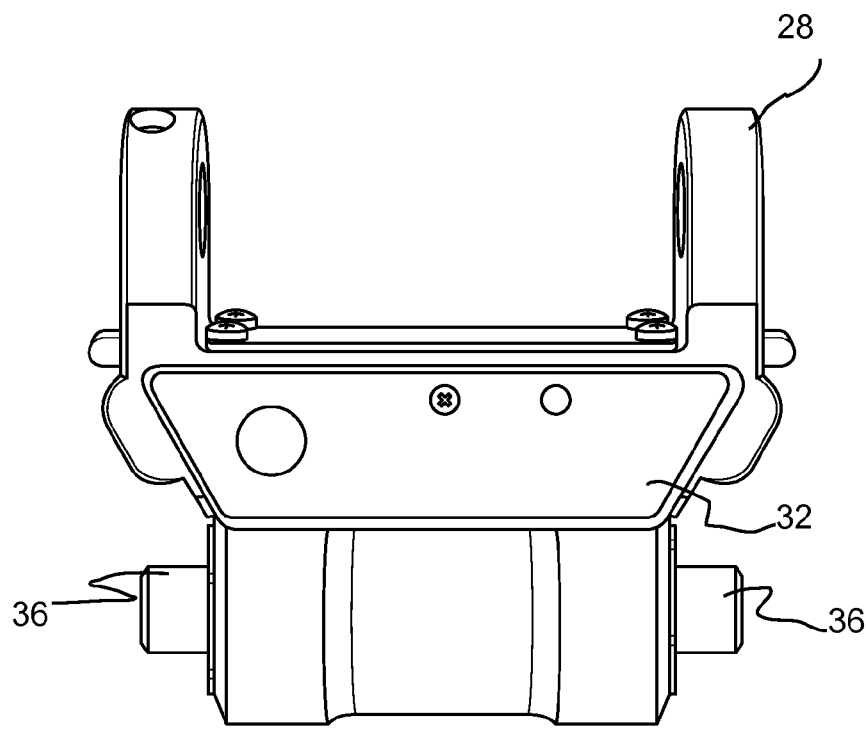
FIG. 4 is a detailed view of the water activated release mechanism.

As noted in FIG. 2, strap 22 can also be used with a non-retractable webbing and attached to a fixed anchor point in the vehicle, such as on the vehicle frame, or upon a seat. In such an embodiment, strap 22 generally has a longer length. Hook 42 can secure the free end of the non-retractable webbing 22 to the anchor point. D-ring 34, in turn, would be secured to the crewmember vest.

In either embodiment, once the occupant is properly secured, in the event the vehicle becomes submerged, release system 28 is activated to release D-ring 34. Once D-Ring 34 is uncoupled, the crewmember is released from the restraint system and is free to exit the vehicle. In the alternative, the crewmember is free to grasp lanyard 54 or cable 52 to open hook 42 and thereby free himself or herself from the restraint system. Again, the crew member is then free to exit the vehicle.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A dual release strap for use in securing an occupant within a restraint system, the restraint system having a first component comprising a vest having first and second attachment points secured to a single ring and a second component, the dual release strap comprising:
    a length of a webbing having a first end and a second end;
    an automatic release mechanism having first and second mounting members, the first mounting member fixedly attached to the first end of the webbing and the second mounting member releasably coupled directly to the single ring, the automatic release mechanism separating the second mounting member from the single ring in response to a triggering event;
    a manual release mechanism having first and second ends, the first end of the manual release mechanism fixedly attached to the second end of the webbing, the second end of the manual release mechanism releasably coupled directly to the second component of the restraint system, the manual release mechanism including a trigger for allowing the occupant to selectively separate the second end of the manual release mechanism from the second component of the restraint system.

2. The dual release strap as described in claim 1 wherein the second component of the restraint system is an overhead reel.

3. The dual release strap as described in claim 1 wherein the first end of the webbing is positioned proximate to a base of the occupant's neck and the second end of the webbing is positioned proximate to a back of the occupant's head.

4. The dual release strap as described in claim 1 and further comprising a cable having a first end and a second end wherein the first end of the cable is secured to the trigger whereby pulling on the cable actuates the trigger thereby separating the second end of the webbing from the second component of the restraint system.

5. The dual release strap as described in claim 4 wherein the second end of the cable is routed through an opening on the vest and is mounted to a front portion of the vest.

6. The dual release strap as described in claim 1 wherein the first and second attachment points are located against a back of the occupant.

* * * * *